United States Patent [19]

Loch

[11] Patent Number: 5,680,206
[45] Date of Patent: Oct. 21, 1997

[54] METHOD AND DEVICE FOR TESTING THE PROPERTIES OF AT LEAST ONE SPLICE IN AT LEAST ONE OPTICAL WAVEGUIDE

[75] Inventor: Manfred Loch, München, Germany

[73] Assignee: Siemens Aktiengesellschaft, Munich, Germany

[21] Appl. No.: 605,117

[22] PCT Filed: Aug. 19, 1994

[86] PCT No.: PCT/DE94/00951

§ 371 Date: Feb. 29, 1996

§ 102(e) Date: Feb. 29, 1996

[87] PCT Pub. No.: WO95/06865

PCT Pub. Date: Mar. 9, 1995

[30] Foreign Application Priority Data

Aug. 30, 1993 [DE] Germany ............ 43 29 182.1

[51] Int. Cl.[6] ................................................. G01N 21/88
[52] U.S. Cl. ................................................... 356/73.1
[58] Field of Search ........................................ 356/73.1

[56] References Cited

U.S. PATENT DOCUMENTS

| | | | |
|---|---|---|---|
| 5,040,866 | 8/1991 | Engel . | |
| 5,078,489 | 1/1992 | Lieber | 356/73.1 |
| 5,187,767 | 2/1993 | Hayes et al. | 385/137 |
| 5,410,396 | 4/1995 | Rochester | 356/73.1 |

FOREIGN PATENT DOCUMENTS

| | | |
|---|---|---|
| 0 393 878 | 10/1990 | European Pat. Off. . |
| 0 543 577 | 5/1993 | European Pat. Off. . |
| 34 29 947 | 2/1986 | Germany . |
| 38 28 604 | 3/1990 | Germany . |
| 55-69006 | 5/1980 | Japan ............ 356/73.1 |
| 57-199931 | 12/1982 | Japan ............ 356/73.1 |
| 3-54433 | 3/1991 | Japan ............ 356/73.1 |

OTHER PUBLICATIONS

Glaesemann et al, "Method for Obtaining Long–Length Strength Distributions for Reliability Prediction", *Optical Engineering*, vol. 30, No. 6, Jun. 1991, pp. 746–748.

*Primary Examiner*—Vincent P. McGraw
*Attorney, Agent, or Firm*—Hill, Steadman & Simpson

[57] ABSTRACT

An optical waveguide splice (SP) is subjected for a prescribable test period to a tensile stress (F), while the light (SL) is launched upstream of the splice (SP) and light (EL) is coupled out downstream of the splice (SP) and the optical power (a) thereof is determined continuously as a function of the tensile stress (F).

20 Claims, 1 Drawing Sheet

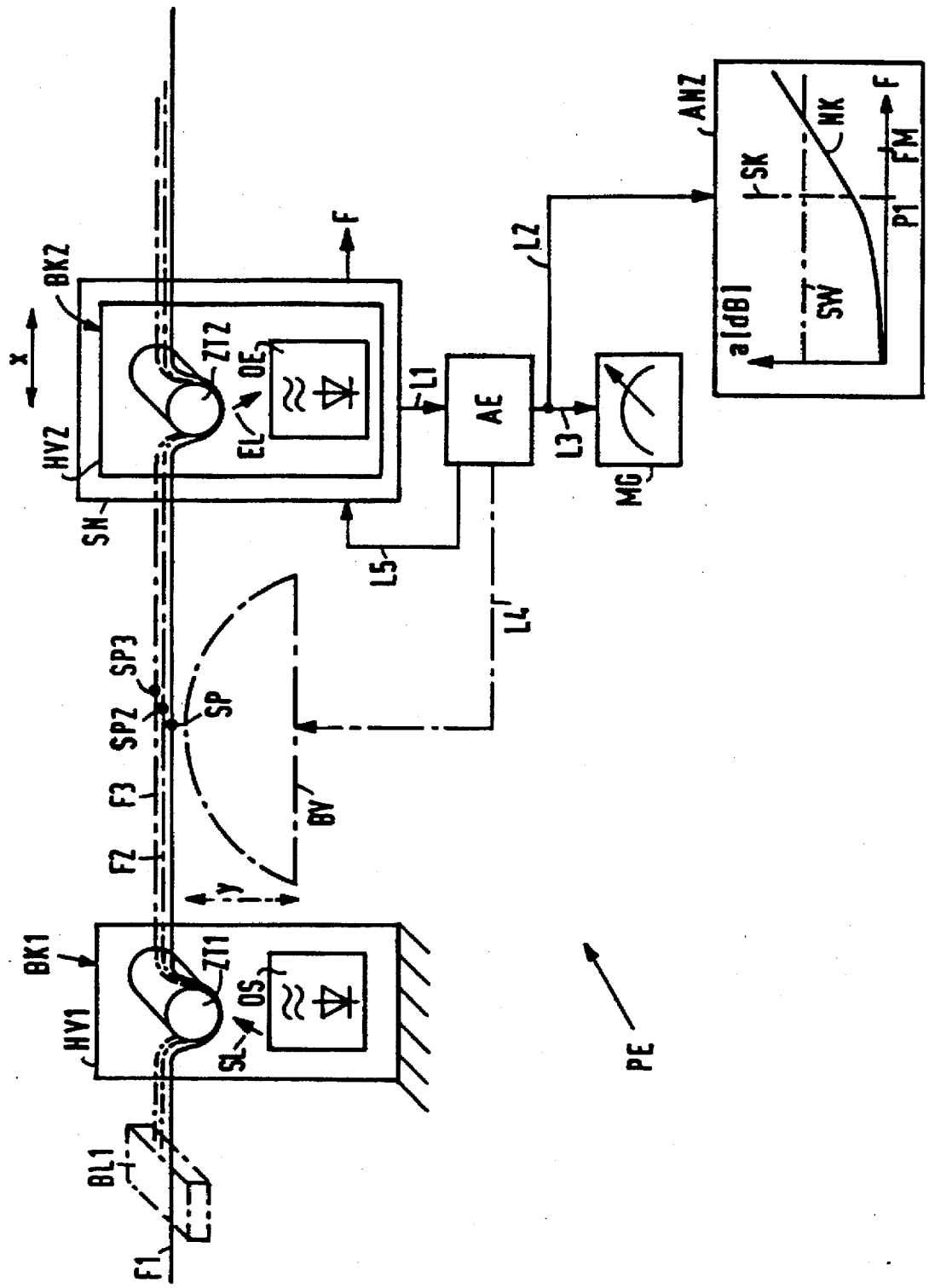

METHOD AND DEVICE FOR TESTING THE PROPERTIES OF AT LEAST ONE SPLICE IN AT LEAST ONE OPTICAL WAVEGUIDE

BACKGROUND OF THE INVENTION

The invention relates to a method and device for testing the properties of at least one splice in at least one optical waveguide.

After a spliced joint of an optical waveguide has been finished, there is a practical interest in the extent to which the finished splice meets the requirements placed on it. However, to date the possibility of checking, for example, the mechanical properties of the finished splice has been only unsatisfactory.

SUMMARY OF THE INVENTION

It is the object of the invention to specify a way in which the properties of at least one finished optical waveguide splice can be checked reliably in a simple way in each case. In accordance with the invention, this object is achieved in a method of the type mentioned at the beginning when during a prescribable test period the splice is subjected to a tensile stress, during loading of the splice with the tensile stress, light is launched into the optical waveguide upstream of the splice and light is coupled out of the optical waveguide downstream of the splice, and the power of the coupled-out light is determined continuously as a function of the tensile stress.

Owing to the fact that the respectively finished splice is subjected to a tensile stress and an optical power which is transmitted, that is to say transferred, via the splice is determined continously in the process as a function of this mechanical tensile loading, it is possible to acquire multifarious, detailed information on the properties, in particular mechanical characteristics, of the splice. Thus, for example, it becomes possible to make reliable statements on the quality of the core alignment and/or cladding alignment of the respective optical waveguide in the region of its splice, on the tensile strength, breaking strength and expansion behavior of said splice, etc. Since the coupled-out optical power is determined continuously as a function of the mechanical loading on the splice, it is possible not only to test the splice for the two states of "optical waveguide severed" or "optical waveguide not severed", but also to conduct an assessment which is much more finely graded.

The invention also relates to a device for testing the mechanical properties of at least one splice in at least one optical waveguide, which is characterized in that at least one tension device is provided which subjects the splice to a tensile stress during a prescribable test period, in that a coupling device is provided upstream of the splice for launching light into the optical waveguide and a coupling device is provided downstream of the splice for coupling light out, and in that an evaluation/control device is provided which determines the power of the coupled-out light continuously as a function of the tensile stress.

Other developments of the invention are specified in the dependent claims.

BRIEF DESCRIPTION OF THE DRAWING

The Figure is a diagrammatic illustration of a device for performing the method of the present invention.

DESCRIPTION OF THE PREFERRED EMBODIMENT

The invention and its developments are explained in more detail below with the aid of a drawing which shows an exemplary embodiment of a test or measuring device PE according to the invention. Represented by way of example in the sole FIGURE is an optical waveguide F1 having a finished splice SP which is produced, for example, by welding, by bonding or by means of other connections (for example a connecting sleeve) of the separate sections, preferably aligned with one another end face to and face of the optical waveguide F1 in the region of its disconnect point. In order to be able in the present exemplary embodiment to launch or couple a measuring light SL into the optical waveguide F1 from left to right as seen along a longitudinal axis, of the waveguide it is preferable to provide a first optical bending coupler BK1 at the transmitting end as a coupling device. For coupling purposes, the optical waveguide F1 is guided in a curved fashion around a bending mandrel or bending cylinder ZT1, which has a shape of a circular cylinder, of the bending coupler BK1. In this launching position the waveguide is retained or locked by a fixed holding device HV1. The holding device HV1 is indicated in the FIGURE only diagrammatically by a rectangular frame. The holding device HV1 is preferably formed by the basic holder of the bending coupler BK1. The top side of this basic holder, on which the bending mandrel ZT1 presses, expediently has a depression or trough resembling a segment of a circular arc for the purpose of accommodating the optical waveguide F1 in a defined fashion. The geometrical shape of this depression is matched to the bending mandrel ZT1, which has the shape of a circular cylinder. In detail, for the purpose of coupling the optical waveguide F1, the procedure is that in the open state of the bending coupler BK1 this optical waveguide is preferably inserted into a groove on the top side of the holding device HV1 and the bending mandrel ZT1 is moved downward in the direction of the hollow of the holding device HV1, with the result that the optical waveguide F1 is guided in a defined curved fashion and retained or fixed in a defined fashion. The optical waveguide F1 is therefore secured in a position by the bending coupler BK1 in the longitudinal direction (axial direction) and in the lateral direction, that is to say transverse to the axis. Further details on the coupling of an optical waveguide according to the principle of the bending coupler are provided, for example, in German Patent 34 29 947 C2 and the corresponding U.S. Pat. No. 5,040,866, where a device for launching light into an optical waveguide is described.

The measuring light SL is launched, preferably as tangentially as possible, into the core of the optical waveguide F1 by means of an optical transmitter OS, in particular a transmitting diode, in the curved region of the bending coupler BK1 and the light is transmitted beyond the finished splice SP to a second coupling device, in particular a second bending coupler BK2. The bending coupler BK2 is constructed in accordance with the bending coupler BK1. The optical waveguide F1 is guided in the coupler BK2 in a curved fashion or in the shape of an arc about a bending mandrel ZT2 which is approximately in the shape of a circular cylinder, and the waveguide is fixed in this coupling-out position by means of a diagrammatically indicated holding device HV2. The holding device HV2 is constructed in this case in a fashion analogous to the holding device HV1 at the transmitting end. In particular, the device HV2 forms the basic holder, corresponding to the mandrel ZT2, of the coupling device. In this arrangement, the optical waveguide F1 is clamped in a defined way in the working position of the bending coupler BK2 between the bending mandrel ZT2 and the holding device HV2, with the result that it cannot be displaced or loosened in an uncontrolled fashion or automatically, particularly in the longitudinal direction. The same also holds if appropriate for the positioning of the waveguide transverse to the axis.

An optical receiver OE, in particular a large-area photodiode, is positioned in the curved region of the bending coupler BK2 at the receiving end. This photodiode detects light components EL coupled out of the measuring light SL and feeds the former via a line L1 to an evaluation/control device AE which preferably operates in a digital and/or analog fashion. The evaluation/control device AE expediently has an arithmetic unit (not represented in the FIGURE) and a measured-value memory. In particular, the optical receiver can also be formed by a plurality of light-sensitive elements, in particular photodiodes, for example in the form of a measuring row or measuring field ("measuring array").

In order preferably to be able to test the mechanical properties of the finished splice SP, a tensile stress F is applied to the latter in the longitudinal direction. For this purpose, the test device PE has a tension device which pulls on the optical waveguide F1 along the longitudinal axis thereof with a force component which is directed away from the splice SP in the axial direction. The tension device, which acts axially on the optical waveguide F1, is formed in the FIGURE by, for example, an actuator SN, which can be moved in the longitudinal direction (axial direction) of the optical waveguide F1, and the fixed bending coupler BK1 at the transmitting end. In this arrangement, the actuator SN preferably receives its control signals via a line L5 from the evaluation/control device AE. The bending coupler BK2 at the receiving end is firmly attached to the actuator SN and can thus be displaced together with the latter in the axial direction, preferably rectilinearly. It is thus possible to use the actuator SN to move the bending coupler BK2 in the axial direction, and tis is indicated by a double arrow x. It is expedient for the actuator SN to have a stepping motor with an associated, axially displaceable slide. The bending coupler BK2 is preferably attached to this slide of the actuator SN. Since the optical waveguide F1 is firmly clamped in the fixed bending coupler BK2 at the receiving end, its splice SP is thus subjected to a tensile stress when the bending coupler BK2 is moved to the right, that is to say away from the fixed bending coupler BK1 at the transmitting end. Thus, it is expedient for the optical waveguide F1 to be retained in a stationary fashion at one end of the splice SP, while at the other, opposite end it is moved away from the splice SP by means of a tension device and thereby is rectilinearly stressed along its longitudinal axis between the two coupling devices, for example BK1, BK2. If appropriate, other relative movements are also possible between the two coupling or holding devices as long as it is possible to exert a tensile force on the splice in a defined way. Thus, in addition to or independently of the exemplary embodiment of the FIGURE it is also possible, for example, to assign to the bending coupler BK1 at the transmitting end an axially movable actuator in a fashion analogous to the actuator SN, at the receiving end, of the bending coupler BK2.

The evaluation/control device AE now drives the actuator SN such that the bending coupler BK2 is moved away to the right from the splice SP. Since the optical waveguide F1 is fixed in a stationary fashion at the transmitting end, that is to say to the left of the splice SP, by the bending coupler BK1, in this process the waveguide F1 is subjected by the axial pulling movement exerted to the tensile stress F, that is to say is tensioned. The bending coupler BK2 is expediently moved away from the splice SP axially by the actuator SN as far as into a prescribable end position in such a way that the tensile stress F which comes to act on the splice SP continuously changes during a prescribable test period. The tensile stress preferably increases continuously during the actual test period up to a prescribable maximum value. In particular, in this case the tensile stress F can be increased, that is to say grow, linearly up to the prescribed maximum value. If appropriate, an exponential rise in the tensile stress F may also be expedient during the actual test period. As an alternative to this, the tensile stress F on the splice SP can preferably also be kept essentially constant during approximately the entire test period. Moreover, it may also be expedient to load the splice SP in addition to the actual test period, that is to say beyond the latter, for a prescribable residual period, doing so essentially by means of a constant tensile stress F, in particular the prescribable maximum tensile stress, before the optical waveguide F1 is untensioned or unloaded again. The splice SP is expediently subjected to at most a tensile stress of 30N, in particular of between 1 and 15N, preferably of between 1 and 4.4N, as well as preferably of between 1.5 and 2N. The total test time (=actual test period+residual period) for the tensile stress loading is expediently selected at between 1 and 20 sec, in particular between 1 and 10 sec, that is to say during this period the splice is under tensile loading. The possible residual period is preferably selected at between 1 and 5 sec.

At the same time, during the loading of the splice by means of the tensile stress F, the bending coupler BK1 is used to launch the measuring light SL continuously into the optical waveguide F1 upstream of the splice SP, and downstream of the splice SP, the components EL of the light, which has been transmitted or passed via the splice SP, are coupled out with the aid of the bending coupler BK2. In this process, the coupled-out power of the coupled-out light EL is determined by means of the evaluation/control device AE as a function of the respective tensile stress F. The power of the coupled-out light EL is preferably measured continuously or constantly in conjunction with a continuous change in the tensile stress F. Thus, depending on the respective tensile stress F acting on the splice SP, during the prescribable test period and/or the residual period, the optical power transmitted, that is to say transferred, via the splice SP is determined and made available for further evaluation in the evaluation/control device AE.

The coupled-out optical power can be detected as a function of the respective tensile stress F, for example by an indicating measuring instrument MG, in particular a pointer instrument, which indicates the signal level coming from the evaluation/control device AE via a line L3. It is then possible, for example, to use the drop in the signal level below a prescribable minimum value for an acceptable splice, executed in a largely centered fashion, as a test criterion.

Instead of the indicating measuring instrument MG, or as a complement thereto, it is also possible to provide a displaying device ANZ, in particular a display, which via a line L2 continuously receives characteristics of the coupled-out optical power from the evaluation/control device AE as a function of the tensile stress F respectively acting on the splice SP. By way of example, in the FIGURE the displaying device ANZ continuously shows as a characteristic of the mechanical properties of the splice SP the attenuation a thereof (in dB) as a function of the continuously varying tensile stress F. For the sake of simplicity, the attenuation a is determined for a calibrated state of the measuring device PE, in which the absolute value of the optical power respectively launched into the optical waveguide is known and is therefore available as reference a quantity for the coupled-out optical power.

The determination of the attenuation can be performed, for example, as described in the document DE 34 29 947 C2. Since the efficiency of the launching or coupling out of the light is not constant in practice in the case of bending couplers, by contrast the measurement of the attenuation is expediently carried out taking account of the air gap attenuation $a_b$, present before the splicing operation, in accordance with the following formula:

$$a_s = 10 \log \frac{P_b}{P_a} + a_b$$

in which $a_s$ is the splice attenuation of the finished spliced joint,
$a_b$ is the air gap attenuation,
$P_b$ is the measured optical power after optimum alignment of the end faces of the optical waveguides with one another, but still before production of the spliced joint SP, and
$P_a$ is the measured optical power after production of the spliced joint.

Given cleaved surfaces of the end faces of the optical waveguides which are acceptably cut, that is to say are as smooth as possible, for example 90° cleaved surfaces, the normal result is an air gap attenuation of approximately 0.3 dB, in particular for monomode fibers.

An acceptably constructed spliced joint is characterized, for example, by the preferably continuous attenuation curve NK in the displaying device ANZ. In simultaneous conjunction with an increase in the tensile stress F, for example, this curve rises slightly, that is to say with a low gradient, preferably first approximately exponentially, and then goes over into a virtually linear variation, approximately from the force value F=P1. As an example, the following is preferably suitable as test criterion: as long as the attenuation curve NK does not exceed a prescribable upper band or threshold SW as a still permissible, tolerable splice attenuation a until reaching a specific maximum value FM for the tensile stress F, the splice SP and/or the environment thereof is regarded as being "in order", that is to say pull-off resistant, and its attenuation is regarded as negligible. In this case, the actual test period is preferably determined by the length of time from the relatively low-tension initial state of the optical waveguide F1, in which F=0N (Newton) in approximate terms, up to the reaching of the maximum tensile stress loading, in which F=FM N (Newton). Not until the upper attenuation threshold a=SW is exceeded in the prescribed tensile stress range of F=0N to F=FM N is the splice SP regarded as being no longer acceptable, that is to say as "defective". During a tensile stress F of up to a maximum value FM of, for example, approximately 2 to 10N, the upper threshold SW for a still permissible splice attenuation a is expediently fixed at between 0.02 and 0.5 dB. If the measured splice attenuation a exceeds the upper threshold SW inside the force range traversed from F=0N (Newton) to F=FM N, the splice SW is regarded as being not acceptably constructed. If, as the case may be, the tensile test even leads to severing of the optical waveguide F1 at the splice SP, the attenuation a increases abruptly (discontinuously) for this tensile stress, and this is indicated in the displaying device ANZ by the vertically extending curve SK marked with dots and dashes, for example for the tensile force P1. Since it is then virtually impossible for any more light to be transferred at the severed splice SP, the attenuation SK rises very sharply in practice, theoretically virtually as far as infinity. It is possible in this way for the tensile strength of the splice SP to be tested and, if appropriate, determined advantageously from the preferably continuous variation in the coupled-out optical power during loading which is accompanied by preferably continuous variation in the tensile stress F.

Within the scope of the invention, "continuous determination" of the coupled-out optical power is preferably understood to mean that more than one measured value is acquired for the coupled-out optical power during the test period, that is to say the targeted or defined loading of the splice SP by means of the tensile stress F. In this case, the tensile stress F can, as explained above, vary continuously, that is to say constantly, or else can essentially remain constant. With particular preference, the recording and observing of the coupled-out optical power can be performed continuously over the entire test period (as in the case of the displaying device ANZ). If appropriate, it can also already be sufficient to record the coupled-out optical power by temporal sampling, that is to say subdivision of the test period. A plurality of discrete measured values a are then available for specific force values in the prescribed sampling interval within the tensile stress test interval from F=0N to F=FM N for the purpose of evaluation.

Finally, it can also, if appropriate, be particularly expedient to follow up on a continuously changing tensile stress force which has possibly been acting on the splice SP by additionally loading this splice by means of a constant tensile stress such as, for example, by means of F=FM N (=extended tensile stress loading test). The coupled-out optical power at the receiving end is detected as continuously as possible throughout the duration of this constant loading as well, that is to say the optical power is determined more than once, in particular continuously, during this residual period as well.

Owing to the fact that a measured value is provided more than once for the coupled-out optical power during the tensile stress loading, it becomes possible for the properties of the splice SP to be assessed with a much finer resolution, that is to say much more finely graded. This advantageously enables the assessment of the "internal" transmission characteristics and mechanical qualities of splices which, although they do not as yet become severed under the action of the predetermined tensile stress values exerted, are nevertheless defective.

Instead of the splice attenuation a, it is therefore possible for further multifarious and detailed information, preferably relating to the mechanical and, if appropriate, optical properties, pertinent to the splice SP, to be obtained from the recorded optical power as a function of the respective tensile loading F which is present. Thus, the evaluation/control device AE can advantageously reliably determine from the coupled-out optical power in the bending coupler BK2 multifarious characteristics such as, for example, the quality of the core glass alignment and/or cladding glass alignment in the region of the splice SP, and the tensile strength, breaking strength and expansion behavior of the latter, etc. Thus, for example, checking of the alignment of the coupling point (splice), which can even be satisfactorily pull-off resistant as the case may be, is also advantageously rendered possible. The outer cladding glass alignment and/or the core glass alignment can preferably be checked. For example, if, as the case may be, there is a defective alignment in the fiber cladding structure, a transverse force can possibly additionally become active on the splice SP during drawing in the axial direction. This transverse force leads in the micro range to a displacement of the core regions, which depending on the core alignment can lead to an increase in the attenuation (in the case of well aligned cores) but also to a decrease in the attenuation (in the case of poorly aligned cores). Checking of the core-to-core alignment is thereby advantageously rendered possible.

On the other hand, it is not only statements concerning the core alignment which are rendered possible, but additionally, or independently thereof, possibly also statements concerning the quality of the alignment of the outer buffer tube or the cladding glass of the optical waveguide. For example, in the case of an optical waveguide having a concentricity error there would be an outer offset nevertheless in the case of exact core alignment. Given tensile loading of this splice there would also be a change in the transmitted light, the advantageous result being the formation of a type of "sensor" for the alignment quality of the opposing, separated sections of the optical waveguide F1 at the splice SP.

Furthermore, it can be expedient, as the case may be, to send light which is polarized (preferably linearly or circularly polarized) via the splice to be tested while the latter is loaded with the tensile stress F. It is possible thereby to make detailed statements on the direction of the forces acting in the immediate vicinity of the coupling point after analyzing the polarization of the light when the light is coupled out at the receiving end, that is to say downstream of the splice SP. Specifically, joints or coupling points having a possible offset (core and/or cladding glass offset), in particular, are mostly somewhat sensitive with respect to temperature changes or curvature loading (bending crush resistance). This resistance is generally undesired (exception: sensor technology). Since such coupling points (splices) are particularly sensitive to transmitted light in the case of tensile stress, and thus cause a change in attenuation, they are therefore advantageously easy to identify and reject.

Since the coupled-out optical power is preferably analyzed continually, in particular continuously, as a function of the mechanical loading in the axial direction, that is to say a combined tensile test/optical power test is continuously carried out, not only a "binary" test with two states of "optical waveguide severed" or "optical waveguide not severed" is rendered possible, but also, advantageously, so is a much more finely graded assessment of the splice SP. Thus, on the basis of the measurement curve NK recorded by way of example in the displaying device ANZ, a multiplicity of measured attenuation values are available, for example, during the states of "stress-free" (tensile stress F=0N) up to maximum tensile stress F=FM N for the purpose of assessing the splice quality. Consequently, it is also advantageously possible to identify as defective splices which, although they do not sever under the action of the tensile stress force, do already represent an impermissibly high attenuation point with respect to message transmission.

It may also be expedient, as the case may be, to subject the splice SP to a completely different force diagrams during a prescribable test time. Thus, for example, the tensile stress F can be constant during a specific (period) test time, or else can be increased linearly, exponentially or in some other way up to a prescribable maximum value, for example FM. Thereafter, the respective splice such as, for example, SP can further, if appropriate, be exposed for a specific residual period to a maximum, constant tensile force for the purpose of a continuous loading test.

In addition to or independently thereof, the splice SP can, if appropriate, also be subjected to a tensile stress F in such a way that the optical waveguide F1 is subjected to a bending stress between the bending coupler BK1 and the bending coupler BK2. In this case, the optical waveguide F1 is firstly retained in a fixed fashion on both sides of the splice SP by the bending coupler BK1 and by the bending coupler BK2 in such a way that the optical waveguide section between the two coupling devices is preferably essentially free from stress. By means of a bending device BV, which can be displaced transverse to the axis, that is to say transverse to the longitudinal axis of the optical waveguide F1, something which is indicated by a double arrow y, the optical waveguide F1 is then bent and, in the process, exposed to a tensile loading in the longitudinal direction and to a bending loading transverse thereto. Suitable as a bending device BV is, for example, a mandrel in the shape of a circular cylinder or a bending cylinder, of which a segment in the shape of a semicircular cylinder is indicated by dots and dashes in the figure. The bending device BV can preferably be driven via a line L4 by the evaluation/control device AE in a defined way and be displaced transverse to the axis in the y-direction (preferably at right angles to the x-direction).

The test device PE according to the invention and/or the associated test method according to the invention can advantageously also be used to test the mechanical properties of a multiple splice such as can be present, for example, in the case of an optical-fiber ribbon having at least one or more individual fibers or individual optical waveguides. In the left-hand part of the figure, the approximately rectangular outer sleeve of an optical-fiber ribbon BL1 is indicated by dots and dashes and then omitted in the remaining part of the figure for the sake of clarity. The optical-fiber ribbon BL1 has, for example, three optical waveguides F1 to F3 with the associated splices SP, SP2 and SP3. Checking of the mechanical properties of the splices SP2 and SP3 is then performed separately in a fashion analogous to the procedure in the case of the splice SP for each individual optical waveguide F2 and F3, that is to say selectively in terms of a fiber. If appropriate, each individual optical waveguide can also have more than one splice to be tested. In particular, the method according to the invention also then permits the testing of more than one splice simultaneously.

The test device PE according to the invention is preferably a component of a single or multiple optical waveguide splicer, an attenuation test set or other optical waveguide test apparatus.

The determination of the splice attenuation can also be performed in this case, if appropriate, as described in U.S. Pat. No. 5,078,489, whose disclosure is incorporated herein by reference thereto and which claims priority from DE 38 28 604 A1, for example. Thus, the so-called "LID" system ("Light Injection and Detection") described there can likewise be used to check the splice. What is understood there is a measurement system in which in a first measurement operation, the measurement signal (measuring light) of a first transmitter is measured at the output of an optical medium (such as, for example, an optical waveguide) in a first measurement receiver. In a second measurement operation, the measurement signal (measuring light) of a second measurement transmitter at the other end of the optical medium is measured in the opposite direction in a second measurement receiver. In a third measurement operation, the measurement signal (measuring light) of the first measurement transmitter is further measured upstream of the optical medium by means of the second measurement receiver, and in a fourth measurement operation the measurement signal of the second measurement transmitter is measured in the first measurement receiver. The attenuation of the optical medium can essentially be determined in the manner of a relative measurement from the four measured values thus obtained. The measurement transmitters and measurement receivers are advantageously coupled out by means of bending couplers. It is then particularly preferred for the respective bending couplers for transmitting and receiving, that is to say the coupling devices (compare BK1, BK2 in the FIGURE) to be integrated in the tension device, for example, formed by HV1, HV2, SN.

The following procedure for checking the mechanical properties of a splice is preferably expedient in practice:

Two optical waveguide sections to be connected to one another are prepared at their end faces which are to be spliced with one another, inserted into the splicer, in particular the fusion-welding apparatus, and aligned with one another end face on and the splicing operation (in particular welding operation) is started. The splicer measures the splice attenuation after splicing, in particular welding.

An optical waveguide spliced in such a way advantageously remains in the splicer for the purpose of tensile testing according to the invention. The tensile test is started, the splicer simultaneously being checked as to whether the two interconnected optical waveguide sections are correctly inserted into the holding system. The measurement system, which is provided for determining the attenuation, is preferably integrated in the holding systems required for the tensile test in order to fix the optical waveguide sections, with the result that it is also advantageously possible to monitor the correct manipulation of the insertion operation. The measurement system thus automatically recognizes whether the test object (optical waveguide) has been correctly inserted and gives the user appropriate instructions as the case may be. Subsequently, the measurement system measures the intensity level of the light transmitted via the unloaded splice, which can be taken as reference quantity for subsequent attenuation measurements during the tensile test.

The actual tensile test is then preferably started with a temporally varying tensile stress, in order to test the mechanical properties of the finished splice. During the tensile test, the power level of the light transmitted via the splice is observed permanently, that is to say constantly or continuously. It can be expedient to terminate the tensile test immediately if the level of the transmitted light changes more strongly than a prescribed limit. If, for example, a change in attenuation, in particular an increase in attenuation, of approximately 0.05 to 0.2 dB is registered, the tensile test is broken off and the splice is regarded as impermissible. If, by contrast, the tensile test proceeds regularly over a permanently set total test time, that is to say without exceeding the prescribed, maximum permitted change in attenuation, the splice is assessed as being "acceptable". It is normal here to select a test time of between 1 sec and 20 sec, in particular 1 and 10 sec, preferably between 1 and 5 sec. As a result, it is advantageously rendered possible to specify in percent or, if appropriate, even in absolute terms the change in attenuation which results with respect to the coupled-out optical power before carrying out the tensile test, that is to say in the largely unloaded state of the splice. Thus, it is possible to use the transmitted level to detect changes in attenuation by virtue of the mechanical loading. Finally, it is possible if appropriate further to undertake an additional measurement of the level of the transmitted light after the tensile test for the purpose of additional monitoring.

Since the splice is loaded under tension and at the same time the optical power respectively transferred via the splice is determined continuously as a function of the tensile stress, which in particular is varying, the actual, mechanical properties of the splice and of its environment can preferably be assessed much better than, for example, in the case of the customary visual monitoring of the splice alone. Tensile testing is thus preferably carried out in combination with the measurement of the optical power, in particular the measurement of the splice attenuation. In other words, the respectively finished splice is preferably exposed to a temporally varying tensile force, and in the process the change in the optical power transmitted (transferred) via the splice is simultaneously observed, that is to say in particular measured and provided for further evaluation.

I claim:

1. A method for testing the properties of at least one splice in at least one optical waveguide, the method during a prescribable test period including the steps of subjecting the splice to a tensile stress, while subjecting the splice to the tensile stress coupling light into the optical waveguide upstream of the splice and uncoupling light out of the optical waveguide downstream of the splice as coupled-out light, and continuously determining both the power of the coupled-out light as a function of the tensile stress and the tensile strength of the splice from the characteristic of the optical power of the coupled-out light.

2. A method according to claim 1, wherein the tensile stress is kept essentially constant during approximately the entire test period.

3. A method according to claim 1, wherein the tensile stress is continuously varied during the test period, and wherein during the change in the tensile stress the power of the coupled-out light is determined as a function thereof.

4. A method according to claim 3, wherein the tensile stress which comes to act on the splice is continously increased up to a prescribable maximum value.

5. A method according to claim 4, wherein the tensile stress is increased in an essentially linear fashion.

6. A method according to claim 4, wherein the tensile stress is increased in an essentially exponential fashion.

7. A method according to claim 4, wherein the tensile stress is increased at first exponentially and then linearly.

8. A method according to claim 3, which includes, in addition to the test period, the tensile stress is kept essentially constant for a specific residual period, and wherein during this residual period, the power of the coupled-out light is measured continuously.

9. A method according to claim 1, wherein the splice is subjected to a tensile stress of at most 30N.

10. A method according to claim 9, wherein the tensile stress is between 2 and 15N.

11. A method according to claim 1, wherein, in order to determine the optical power continuously, the latter is measured continously during the test period.

12. A method according to claim 1, wherein, in order to determine the optical power continuously, the latter is measured discretely by means of more than one sampled measured value during the test period.

13. A method according to claim 1, wherein the step of subjecting includes retaining the optical waveguide on one side of the splice and pulling on the longitudinal axis of the optical waveguide on an opposite side of the splice by means of a tension device.

14. A method according to claim 1, wherein the step of subjecting includes retaining the optical waveguide at a position upstream and at a position downstream of the splice and then bending the waveguide between the upstream and downstream positions with a bending device to create the tensile stress in a longitudinal direction.

15. A device for testing the mechanical properties of at least one splice in at least one optical waveguide, said device including at least one tension means for subjecting the splice to a tensile stress during a prescribable test period, coupling means being provided upstream of the splice for coupling light into the optical waveguide, coupling means being provided downstream of the splice for uncoupling light from the waveguide as coupled-out light, and evaluation/control means for determining both the power of the coupled-out light continuously as a function of the tensile stress and the tensile strength of the splice from the characteristics of the coupled-out light.

16. The device as claimed in claim 15, wherein the device is a component of an optical waveguide splicer.

17. A device according to claim 15, wherein the tensile means is formed by an actuator which can be moved in the longitudinal direction of the optical waveguide.

18. A device according to claim 15, wherein a bending coupler is respectively provided for each coupling means.

19. A device according to claim 15, wherein the tension means is formed by a bending device which bends the optical waveguide transverse to the longitudinal extent between the two coupling means.

20. A device according to claim 15, wherein at least one coupling means is integrated in the tension means.

* * * * *